United States Patent
Su et al.

(10) Patent No.: US 9,036,757 B1
(45) Date of Patent: May 19, 2015

(54) POST-CURSOR LOCKING POINT ADJUSTMENT FOR CLOCK DATA RECOVERY

(71) Applicant: ORACLE INTERNATIONAL CORPORATION, Redwood City, CA (US)

(72) Inventors: Jianghui Su, San Jose, CA (US); Francis Schumacher, Santa Clara, CA (US); Zuxu Qin, Santa Clara, CA (US); Dawei Huang, San Diego, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 14/493,652

(22) Filed: Sep. 23, 2014

(51) Int. Cl.
*H04L 7/00* (2006.01)

(52) U.S. Cl.
CPC ................... *H04L 7/0016* (2013.01)

(58) Field of Classification Search
CPC ....... H03L 7/089; H03L 7/093; H03L 7/0814; H03L 7/033; H04L 2025/03592; H04L 25/03019; H04L 7/0087
USPC ......................................................... 375/355
See application file for complete search history.

(56) References Cited

U.S. PATENT DOCUMENTS

| | | | |
|---|---|---|---|
| 2003/0091139 A1* | 5/2003 | Cao ............................... | 375/376 |
| 2009/0161747 A1* | 6/2009 | Aziz et al. ...................... | 375/231 |
| 2010/0238993 A1* | 9/2010 | Huang et al. ................... | 375/233 |
| 2012/0170621 A1* | 7/2012 | Tracy et al. .................... | 375/219 |
| 2013/0241622 A1* | 9/2013 | Zerbe et al. .................... | 327/323 |

* cited by examiner

*Primary Examiner* — Don N Vo
(74) *Attorney, Agent, or Firm* — Marsh Fischmann & Breyfogle LLP; Daniel J. Sherwinter

(57) ABSTRACT

Embodiments include systems and methods for applying post-cursor locking point adjustment to an at-rate clock data recovery (CDR) system. Some embodiments operate in context of a CDR circuit of a serializer/deserializer (SERDES). In one embodiment, a training routine is used to determine an optimal post-cursor target level. Increasing or decreasing the post-cursor target level can cause the CDR clocking to shift right or left, which can be seen as a shift of the channel impulse response with respect to the CDR sampling locations. In some implementations, the post-cursor can be locked to the determined target level. In other implementations, the determined target level can be compared to a fully-adapted post-cursor to tune adaptations performed by transmitter and/or receiver equalizers.

20 Claims, 7 Drawing Sheets

POST-CURSOR LOCKING POINT ADJUSTMENT FOR CLOCK DATA RECOVERY

FIELD

Embodiments relate generally to serializer/deserializer (SERDES) circuits, and, more particularly, to techniques for at-rate clock data recovery locking point adjustment.

BACKGROUND

Serializer/deserializer (SERDES) circuits are becoming ubiquitous in many computational environments. The SERDES can compress a relatively wide, parallel input into a relatively narrow, serial signal (e.g., a single "bit," differential signal) for communication over a serial bus. The serial bus switches at an appreciably higher rate than the parallel bus, and serial communication of the data stream tends to reduce cost, complexity, power, and board real estate relative to comparable parallel communications. As bus speeds increase, parallel communications manifest even higher power consumption and more issues relating to timing (e.g., skew mismatches and bit misalignment), making SERDES circuits even more attractive.

Typically, the SERDES has one or more components that sample a received analog serial signal into discrete bits for various purposes. For example, the SERDES can include clock data recovery (CDR) and decision feedback equalization (DFE) adaptation components that can attempt to shift clocking locations to optimize sampling reliability. This can involve determining where signal transitions (e.g., zero-crossings) occur, which can often be frustrated by clock jitter, noisy data, small signal levels, and/or other difficult conditions.

BRIEF SUMMARY

Among other things, embodiments provide novel systems and methods for applying post-cursor locking point adjustment to an at-rate clock data recovery (CDR) system. Some embodiments operate in context of a CDR circuit of a serializer/deserializer (SERDES). In one embodiment, a training routine is used to determine an optimal post-cursor target level. Increasing or decreasing the post-cursor target level can cause the CDR clocking to shift right or left, which can be seen as a shift of the channel impulse response with respect to the CDR sampling locations. In some implementations, the post-cursor can be locked to the determined target level. In other implementations, the determined target level can be compared to a fully-adapted post-cursor to tune adaptations (e.g., pulse shaping) performed by transmitter and/or receiver equalizers.

According to one set of embodiments, a system is provided for at-rate clock data recovery. The system includes an at-rate clock data recovery (CDR) sub-circuit and a training sub-circuit. The at-rate clock data recovery (CDR) sub-circuit operates to: receive a data signal generated from a predetermined sequence of training data; and sample the data signal according to each of a number of proposed target post-cursor levels to generate associated sets of sampled training data. The training sub-circuit operates to: calculate, for each of the proposed target post-cursor levels, an associated apparent link quality by comparing the associated set of sampled training data with the predetermined sequence of training data; calculate a range of proposed target post-cursor levels for which the associated apparent link qualities are above a predetermined threshold; and output a feedback signal to adapt a locking point of the at-rate CDR sub-circuit according to the calculated range of proposed target post-cursor levels.

According to another set of embodiments, a method is provided for at-rate clock data recovery. The method includes: receiving a data signal generated from a predetermined sequence of training data; for each of a number of proposed target post-cursor levels: sampling the data signal using a clock data recovery (CDR) circuit according to the proposed target post-cursor level to generate an associated set of sampled training data; and calculating an associated apparent link quality by comparing the associated set of sampled training data with the predetermined sequence of training data; calculating a range of proposed target post-cursor levels for which the associated apparent link qualities are above a predetermined threshold; and adapting the clock data recovery of the CDR circuit as a function of the calculated range of proposed target post-cursor levels.

According to another set of embodiments, a method is provided for tuning clock data recovery for a serial data channel. The method includes: detecting a training condition; in response to detecting a training condition, transmitting a data signal comprising a predetermined sequence of training data over the serial data channel from a transmitter system to a receiver system a predetermined number of iterations; for each of the iterations: sampling the data signal using an at-rate clock data recovery (CDR) circuit according to an associated proposed target post-cursor level to generate an associated set of sampled training data; and calculating an associated apparent link quality by comparing the associated set of sampled training data with the predetermined sequence of training data; calculating a range of proposed target post-cursor levels for which the associated apparent link qualities are above a predetermined threshold; and adapting the clock data recovery of the CDR circuit as a function of the calculated range of proposed target post-cursor levels.

BRIEF DESCRIPTION OF THE DRAWINGS

The present disclosure is described in conjunction with the appended figures.

Figure 1:
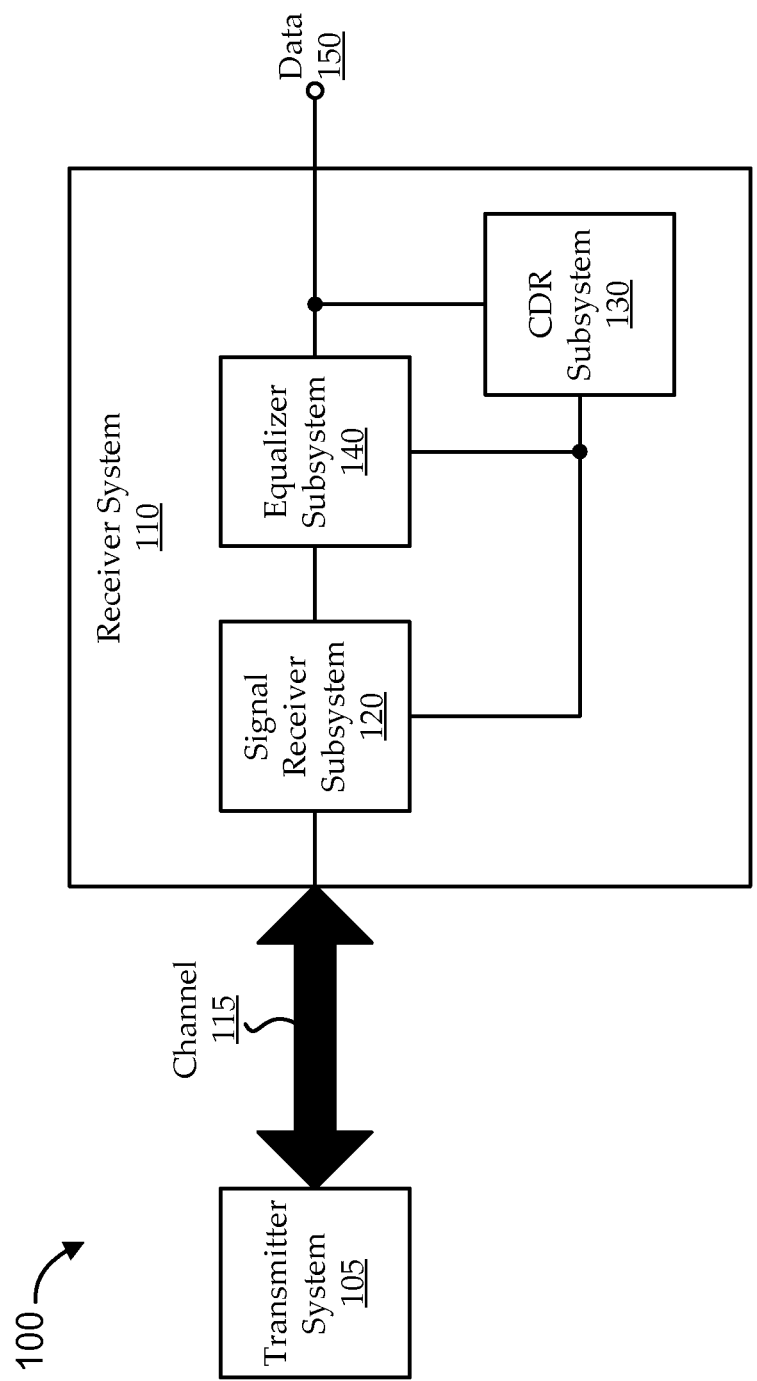
FIG. 1 shows a block diagram is shown of an illustrative communications environment, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Many electronics applications include communications channels that have transmitter and receiver components to move data through the electronics application. Some receiver circuits are serializer/deserializer (SERDES) receiver circuits that can, for example, convert parallel data from the communications channel into a serial data stream for processing, etc. For example, a transmitter (TX) serializes differential data lines into a single, high-speed differential output, which can be fed through an equalizer (e.g., a finite impulse response (FIR) filter-based equalizer) that can shape the transmitted pulse to compensate for undesirable channel characteristics, such as frequency-dependent channel loss.

Various functions of the SERDES rely on clocking to effectively sample and/or process the data being received from the channel, and the clock signal is often recovered from the data itself using a clock data recovery (CDR) circuit. One type of CDR circuit (sometimes referred to as a "bang-bang CDR" or an "oversampling CDR") attempts to extract clock timing information from both data and edge samples. Thus, the rate of the resulting clock signal is double the data rate. Another type of CDR circuit (sometimes referred to as a "Muller-Mueller" or "MM" CDR) uses data samples, but not edge samples, to recover clock timing information. Thus, the rate of the resulting clock signal is the data rate, and such CDR techniques are often referred to as "at-rate" or "baud rate" CDR. At-rate CDR techniques provide various features. For example, avoiding double-rate clocking can appreciably reduce power consumption.

It is generally desirable for the receiver circuit to clock received data in the center of the "data eye," which can improve data recovery, reduce error, increase link margin, etc. Finding the optimal clocking location is typically a dynamic process that involves the CDR circuit and equalization circuitry (e.g., a decision feedback equalizer, linear equalizer, feed-forward equalizer, etc.). Typical at-rate CDR techniques extract timing information by analyzing a channel pulse response at one or more sample locations and determining whether current clocking appears to be early or late with respect to the pulse response. The clocking signal can then be shifted, as appropriate. However, a number of factors, such as inter-channel interference and clock jitter, can tend to frustrate accurate clock data recovery from the channel pulse response.

As used herein, CDR analysis of the channel pulse response is described with reference to a pulse-response precursor "h(−1)," a pulse-response cursor "h(0)," and a pulse-response post-cursor "h(1)," where h(−1) and h(1) are adjacent on either side of h(0). The "h" locations effectively indicate where the present clock timing falls with respect to the pulse response. For example, h(−1) and h(1) are each separated from h(0) by one unit interval (UI). Thus, the post-cursor represents the inter-symbol interference (ISI) at one UI after the signal sampling point. For the sake of illustration, if there is a symmetric channel pulse response, and the CDR is locking perfectly, the h(0) sampling location can coincide with the center (peak) of the pulse and the center of the data eye. However, channel loss, clock jitter, inter-symbol interference, and/or other conditions can cause the locking point to shift away from an optimal location and/or various adaptations (e.g., by equalizers on the transmitter and/or receiver sides of a data channel) can cause the channel pulse response to be asymmetric. For at least these reasons, it is often difficult to accurately find the center of the data eye and an optimal locking point for the CDR.

Embodiments described herein determine an appropriate CDR locking target and effectively force the channel to adapt according to that target, rather than manipulating the CDR itself. For example, a training routine is used to determine an optimal post-cursor target level. In some implementations, the post-cursor can be locked to the determined target level. Increasing or decreasing the post-cursor target level can cause the CDR clocking to shift right or left, which can be seen as a shift of the channel impulse response with respect to the CDR sampling locations. In other implementations, the determined target level can be compared to a fully-adapted post-cursor to determine if adaptations (e.g., pulse shaping) being performed by transmitter and/or receiver equalizers are causing the CDR locking point to be in a non-optimal location (i.e., too late or too early). The information can be fed back to the transmitter and/or receiver equalizers, which can change their respective adaptations, and effectively shift the CDR locking point to a more optimal location.

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Turning first to FIG. 1, a block diagram is shown of an illustrative communications environment 100, according to various embodiments. The communications environment 100 includes a transmitter system 105 and a receiver system 110 in communication via a data channel 115. For example, the transmitter system 105 can include any suitable components, such as a driver, for communicating data over the data channel 115. The data channel 115 can be any parallel or serial, wired or wireless, or other suitable communications channel for carrying the data. The receiver system 110 can be implemented in any suitable manner, for example as an integrated circuit that is part of and/or in communication with very-large-scale integration VLSI circuits, communication systems, storage area networks, local area networks, wide area networks, data centers, memory components, electronic devices, memory systems, and/or computer systems (such as multiple-core processor computer systems, computer systems that include components that communicate via capacitive proximity communication, computer systems that include components that communicate via optical proximity communication, etc.).

As illustrated, the receiver system 110 includes a signal receiver subsystem 120, a CDR subsystem 130, and an equalizer subsystem 140. While the receiver system 110 is illustrated as a simplified functional block diagram to avoid over-complicating the description and figures, these simplifications should not be construed as limiting embodiments and implementations. The receiver system 110 can include fewer or additional components, and the various functional blocks can each be implemented as one or more discrete components, combined with other functional blocks into a single component, implemented in any suitable architecture or arrangement, etc. For example, the receiver system 110 includes any suitable components for receiving a data signal from the data channel 115 and reliably outputting data 150 as desired by other systems or components in communication with the receiver system 110. The signal receiver subsystem 120 can include amplifiers, filters, analog-to-digital converters, parallel or serial interface components, and/or any other suitable components for converting the received data signal from the data channel 115 into a signal that can be used by other components of the receiver system 110. The CDR subsystem 130 implements an at-rate CDR, such as a Muller-Mueller CDR, or the like. As described below, embodiments of the CDR subsystem 130 implement a controllable (e.g., programmable) early/late offset for effectively skewing the statistical voting results and tuning the CDR subsystem 130 to a position either earlier or later than the h(−1)=0 position.

The equalizer subsystem 140 can include a decision feedback equalizer, a linear equalizer, a feed-forward equalizer, and/or any other suitable equalization components. For example, some implementations of the equalizer subsystem 140 provide feedback (or feed-forward) equalization to the CDR 130 including outputting a clocking signal to the CDR subsystem 130. In some embodiments, the equalizer subsystem 140 can implement pulse shaping and/or other techniques, along with the CDR 130 to help compensate for channel losses, inter-symbol interference, clock jitter, etc. Some embodiments of the transmitter system 105 also include an equalizer and/or filter. For example, feedback from the receiver system 110 can be used by the transmitter system 105 (e.g., by a finite impulse response (FIR) unit) to shape the transmitted pulse, such that the received pulse is effectively pre-compensated for certain characteristics of the channel 115.

Figure 2:
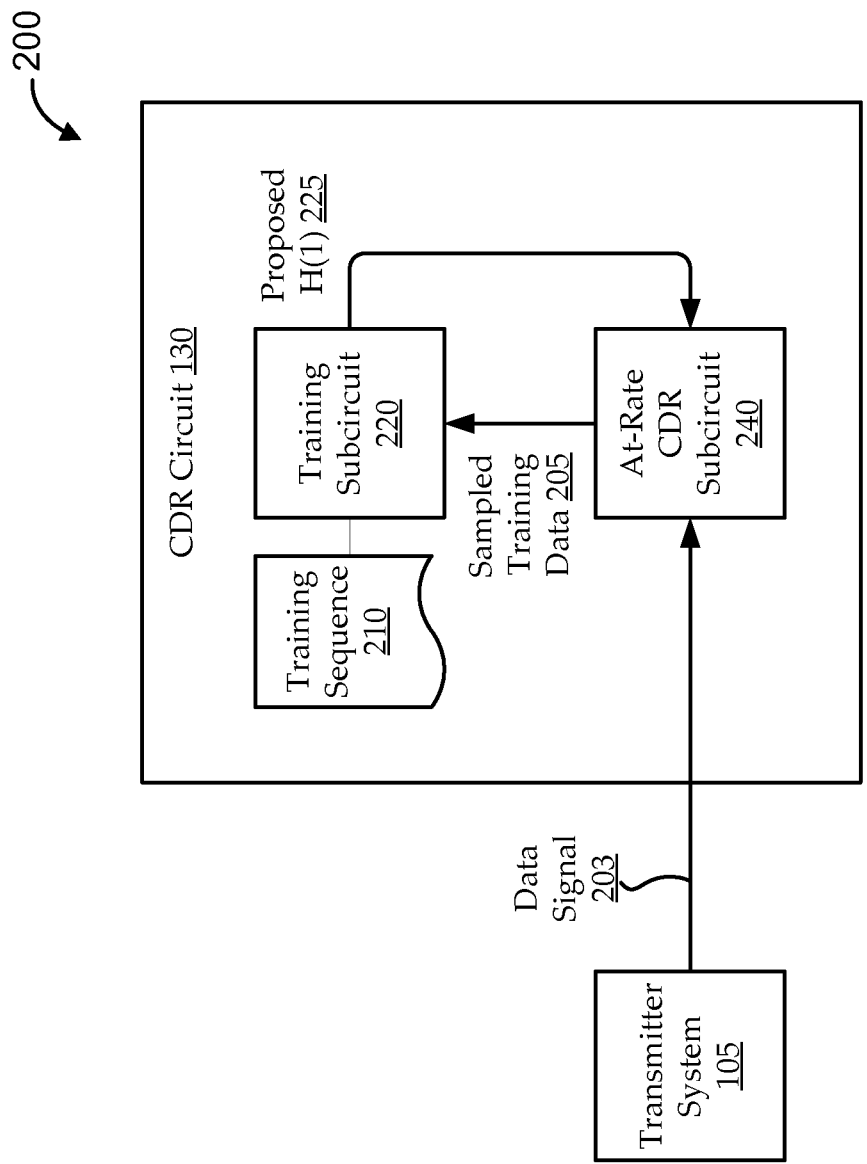
FIG. 2 shows an illustrative circuit block diagram for implementing embodiments of the CDR subsystem.

FIG. 2 shows an illustrative circuit block diagram 200 for implementing embodiments of the CDR subsystem 130 (illustrated as CDR circuit 130). As illustrated, the CDR circuit 130 includes a training sub-circuit 220 and an at-rate CDR sub-circuit 240. As illustrated, the CDR sub-circuit 240 can receive a data signal 203 from a transmitter system 105 (e.g., as described with reference to FIG. 1), for example, over a serial bus or other suitable data channel. For the purposes of certain embodiments, the data signal 203 can include a sequence of training data. For example, during a training routine, the transmitter system 105 sends to the CDR circuit 130 a pre-determined sequence of bits of some length (e.g., thousands or millions of bits). The same sequence can be stored by, regenerated though the calculation with one set of the incoming data and a predefined algorithm, or otherwise provided to, the training sub-circuit 220 as a training sequence 210.

The CDR sub-circuit 240 can derive a channel pulse response and clocking information from the data signal 203, which it can use to output sampled data. Implementations of the CDR sub-circuit 240 seek an optimal locking point for sampling the data signal 203 that minimizes error (e.g., the center of the data eye, etc.). In context of the training routine, the sampled data output from the CDR sub-circuit 240 can be sampled training data 205. If the CDR sub-circuit 240 is sampling accurately, the sampled training data 205 should match the sequence of training data sent via the data signal 203. However, if the CDR sub-circuit 240 is not finding an optimal locking point (e.g., if the CDR sub-circuit 240 and/or adaptive functions of the transmitter or receiver are not adequately or accurately compensating for channel artifacts), there will be differences (i.e., errors) in the sampled training data 205 as compared to the expected sequence of training data. Embodiments of the training sub-circuit 220 can compare the sampled training data 205 with the training sequence 210 expected by the training sub-circuit 220. The comparison can form the basis of a link quality metric. For example, the link quality can be, or can be a function of, the number of errors found in the sampled training data 205 as compared to the training sequence 210.

Embodiments seek an optimal locking point for the CDR sub-circuit 240, for example, to maximize link quality, minimize error, etc. The optimal locking point can typically be at the center of the data eye. However, due to various channel artifacts and/or adaptations (e.g., pulse shaping by the transmitter and/or receiver), the center of the data eye may not coincide with the peak of the channel pulse response and/or may be otherwise difficult to determine. For example, traditional CDR algorithms often calculate their locking point based on the signal received at its inputs from the channel (e.g., the data signal 203). As the CDR cannot directly change what it receives, many traditional implementations feed tuning information back to the transmitter system 105, for example, to its FIR unit or other equalizer or filter. The transmitter system 105 can then tune the data signal, for example by pulse shaping, which can tend to cause the CDR to shift its locking point and/or cause the data eye or pulse peak to shift relative to the locking point. However, such techniques can be limited for a number of reasons. For example, communicating feedback signals between multiple chips over a transmission channel can introduce additional sources of error and/or delay, the FIR unit or other transmitter system 105 equalizer may not have sufficient resolution to make appropriate adjustments, etc. Alternatively, some traditional implementations include a decision feedback equalization (DFE) unit, or other adaptive equalization unit, in the receiver system. However, such approaches can have drawbacks, such as adding overhead (e.g., with additional circuitry, etc.), etc. Still, some implementations described herein can operate in context of transmitter-side and/or receiver-side equalization units. For example, rather than impacting the CDR itself, implementations set a locking point target, which can be used as feedback for those types of equalizer units.

Embodiments of the training sub-circuit 220 seek a range of locking point targets for which the link quality is sufficiently good. In some implementations, a training routine iterates through a range of proposed H(1) levels 225. The H(1) levels 225 are the post-cursor levels described above. Each proposed H(1) level 225 in the range can be communicated to the at-rate CDR sub-circuit 240 as a post-cursor target level, and the at-rate CDR sub-circuit 240 can generate sampled training data 205 according to that post-cursor target level. The sampled training data 205 can be compared against the expected training sequence 210 to determine the apparent link quality associated with that proposed H(1) level 225. After iterating through the range of proposed H(1) levels 225, the training sub-circuit 220 can have data associating each proposed H(1) level 225 with a respective apparently link quality, from which it can derive a range of proposed H(1) levels 225 over which the apparent link quality exceeds a predetermined threshold. For example, the threshold can be the range over which the sampled training data 205 exactly matches the expected training sequence 210, or where some acceptable amount of error is observed. An optimal one of the proposed H(1) levels 225 can be calculated from the range of proposed H(1) levels 225.

In some implementations, the optimal H(1) level is the center of the derived range. For the sake of illustration, suppose the training sub-circuit 220 iterates through a set of proposed H(1) levels 225, and acceptable apparent link qualities are found in association with H(1) levels ranging between 5 mV and +15 mV. The optimal H(1) level can be calculated as +10 mV, the center of the derived range. In other implementations, there may be reasons to choose an optimal H(1) value as a level other than the center of the range. In general, the center of the range is likely to be at or very close to the center of the data eye opening, as the data eye substantially reflects the link quality. For example, the opening of the data eye is related to the receiver's differentiation between bit values, so that the center of the eye opening can be substantially the point at which the best differentiation (i.e., the least error) occurs.

In some embodiments, the optimal H(1) level can be fed back to the at-rate CDR sub-circuit 240 and used to lock the post-cursor target to that optimal H(1) level determined by the training sub-circuit 220. The at-rate CDR sub-circuit 240 (and/or other units of the transmitter and/or receiver systems) can remain fully adaptive. However, the clock data recovery can effectively be at a fixed location with respect to the channel pulse response of the incoming data signal 203. Such an approach can manifest certain features. One such feature is that the messaging (e.g., signaling used by adaptation units, etc.) can be kept local to the receiver side, and can remain well contained. Another such feature is that the resolution of the clock data recovery location control can be relatively very high, which can permit an accurately centered locking point.

While locking the target H(1) level can provide certain benefits, such an approach can also limit the ability of the system to adapt to changing environmental conditions and/or different operating environments. For example, the locked value may only be optimal under a particular set of conditions present at the time of the training routine. Over time, it can be desirable to re-run the same or a different training routine to re-optimize the H(1) target level. For example, some implementations execute the training routine at each boot-up sequence of a computational system that incorporates the CDR circuit 130; periodically or otherwise on a schedule; automatically, and/or manually (on demand), when data errors are detected; and/or at any other suitable time. Further, one or more training routines can be used for different purposes. For example, a longer training sequence 210 (e.g., millions of bits) can be used for a boot-time training routine, and a shorter training sequence 210 (e.g., thousands of bits) can be used for periodic data audits, or the like.

Other approaches can be more adaptive. Traditional at-rate CDR sub-circuits 240 design H(1) to be adaptive, which can permit the CDR system to adapt to changing environmental conditions and/or different operating environments. For example, permitting H(1) to adapt can allow the at-rate CDR sub-circuit 240 to respond to changes in voltage, temperature, humidity, etc. and/or to differences in circuit manufacturing process corners, channel differences, etc. In many traditional implementations, H(1) is used for decision feedback equalization (DFE) adaptation (e.g., to compensate for inter-symbol interference, or the like), so that the clock data recovery can be largely based on the H(1) information. For example, adaptations in the H(1) location can effectively adapt the location of the H(0) sampling point (e.g., the H(1) location can typically be one unit interval after the H(0) sampling point in the time domain). Accordingly, while the optimal H(1) level can be derived by the training sub-circuit 220 for one set of conditions (e.g., for data coming over a particular channel under particular environmental conditions), those conditions can change. As such, the training sequence can be re-run at various time (e.g., as explained above) and/or can be used to facilitate other types of adaptation, for example, as described below with reference to FIG. 3.

Figure 3:
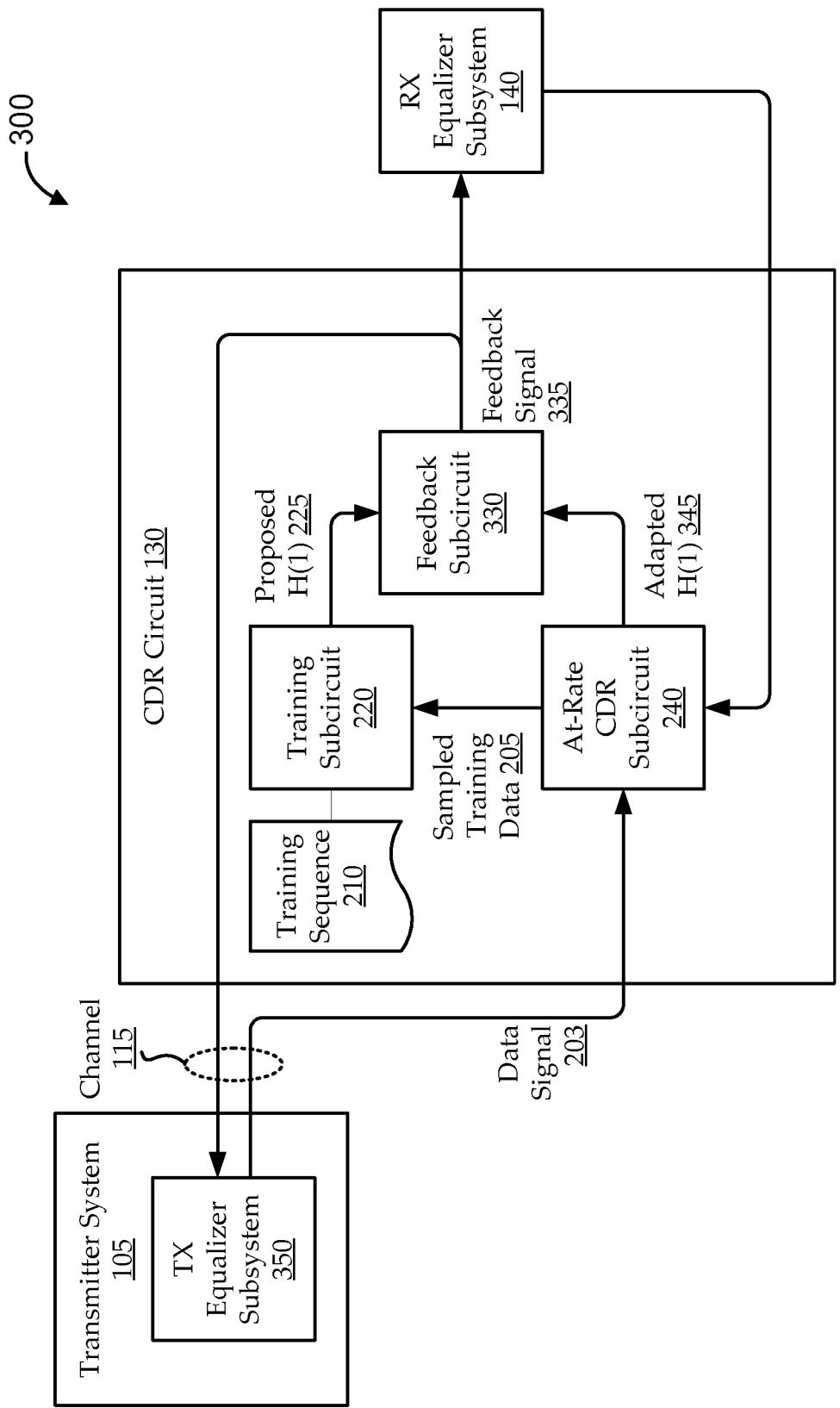
FIG. 3 shows another illustrative circuit block diagram for implementing embodiments of the CDR subsystem.

FIG. 3 shows another illustrative circuit block diagram 300 for implementing embodiments of the CDR subsystem 130 (illustrated as CDR circuit 130). As illustrated, the CDR circuit 130 includes a training sub-circuit 220, an at-rate CDR sub-circuit 240, and a feedback sub-circuit 230. The CDR sub-circuit 240 and the training sub-circuit 220 can operate substantially as described with reference to FIG. 2. For example, the at-rate CDR sub-circuit 240 can receive a data signal 203 from a transmitter system 105 over a serial bus or other suitable data channel. During a training routine, the transmitter system 105 can send a pre-determined sequence of bits, which can be sampled by the at-rate CDR sub-circuit 240 to generate sampled training data 205. The sampled training data 205 can be compared against a training sequence 210 by a training sub-circuit 220 to measure link quality at various proposed H(1) levels 225. The training sub-circuit 220 can use the link quality information to calculate a range of acceptable proposed H(1) levels 225 and/or an optimal H(1) level.

As described with reference to FIG. 1, the optimal H(1) level determined by the training sub-circuit 220 can be used to lock a post-cursor target for the at-rate CDR sub-circuit 240. In other embodiments, the range of acceptable proposed H(1) levels 225 and/or the optimal H(1) level can be used as feedback for other equalizer circuits. As illustrated, one or more proposed H(1) levels 225 (e.g., the range of H(1) levels determined by the training sub-circuit 220 to yield good link quality) can be communicated to a feedback sub-circuit 230 of the CDR circuit 130. The at-rate CDR sub-circuit 240 can be left to fully adapt (i.e., not locked to a particular H(1) target level), and can output its fully adapted H(1) level 345 to the feedback sub-circuit 230. Implementations of the feedback sub-circuit 230 can use the proposed H(1) levels 225 and the fully adapted H(1) level 345 to generate one or more feedback signals 335.

For example, if the fully adapted H(1) level 345 is determined to be in the center of the range of proposed H(1) levels 225 that yield good link quality (or close enough to the center, according to a predefined tolerance), the feedback sub-circuit 230 can conclude that the fully adapted H(1) level 345 is already optimal, and no further adaptations are needed. If the fully adapted H(1) level 345 is determined not to be in the center of the range of proposed H(1) levels 225, the feedback sub-circuit 230 can conclude that adaptations are needed. For example, if the fully adapted H(1) level 345 is determined to be too far to the left of the range, that can indicate that the fully adapted H(1) level 345 is similarly to the left of the center of the data eye opening; and the pre-cursor timing can be increased (i.e., shifted right). If the fully adapted H(1) level 345 is determined to be too far to the right of the range, that can indicate that the fully adapted H(1) level 345 is similarly to the right of the center of the data eye opening; and the pre-cursor timing can be decreased (i.e., shifted left). In this way, the feedback signal(s) 335 can be used for pre-cursor adaptation, or the like. For example, the feedback signal(s) 335 can be communicated to a receiver-side equalizer sub-system 140 (e.g., a decision feedback equalization (DFE) unit, a feed-forward equalizer (FFE) unit, etc.) and/or a transmitter-side equalizer subsystem 350 (e.g., a finite impulse response (FIR) filter-based equalizer unit, etc.).

Figure 4:
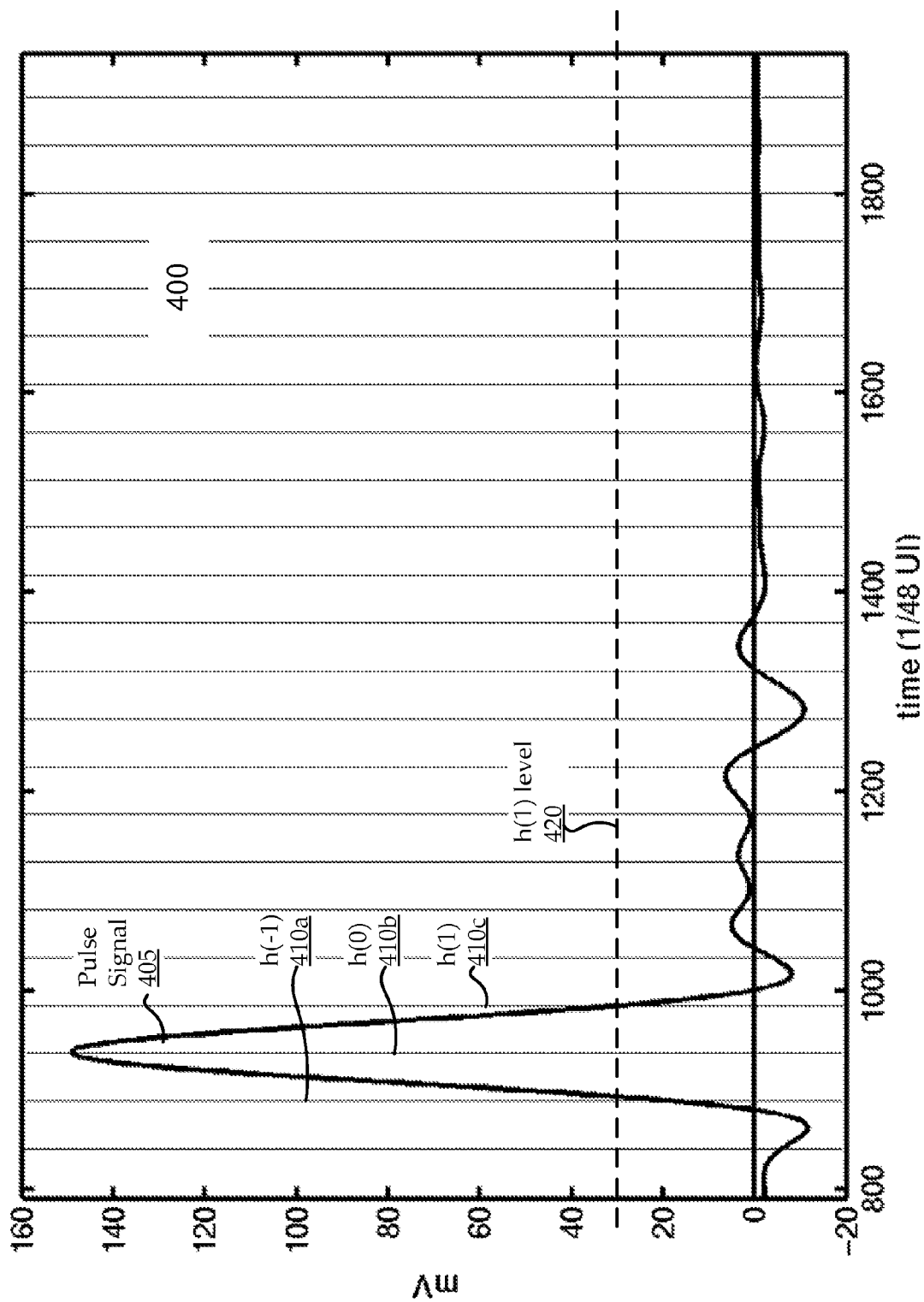
FIG. 4 shows a graph of an illustrative channel pulse response signal in context of various sampling point unit intervals.

For the sake of added clarity, FIG. 4 shows a graph 400 of an illustrative channel pulse response signal 405 in context of various sampling point unit intervals 410. In particular, examples of a pre-cursor 410a, a cursor 410b, and a post-cursor 410c are shown. The post-cursor level 420 is shown as a dashed line. The size of each UI can be considered as fixed, so that shifting either of the pre-cursor 410a or the post-cursor 410c can effectively shift the cursor 410b (e.g., the locking point). Close examination of the graph 400 reveals that the signal 405 is slightly asymmetric with respect to the unit intervals 410. For example, the signal 405 does not cross the pre-cursor 410a and the post-cursor 410c at precisely the same post-cursor level 420, and the cursor 410b is not precisely at the peak of the signal 405. This can illustrate various difficulties. For example, pre-cursor adaptation may yield different results from post-cursor adaptation, those adaptations may not result in the locking point coinciding precisely with the peak of the signal 405, etc.

Figure 5:
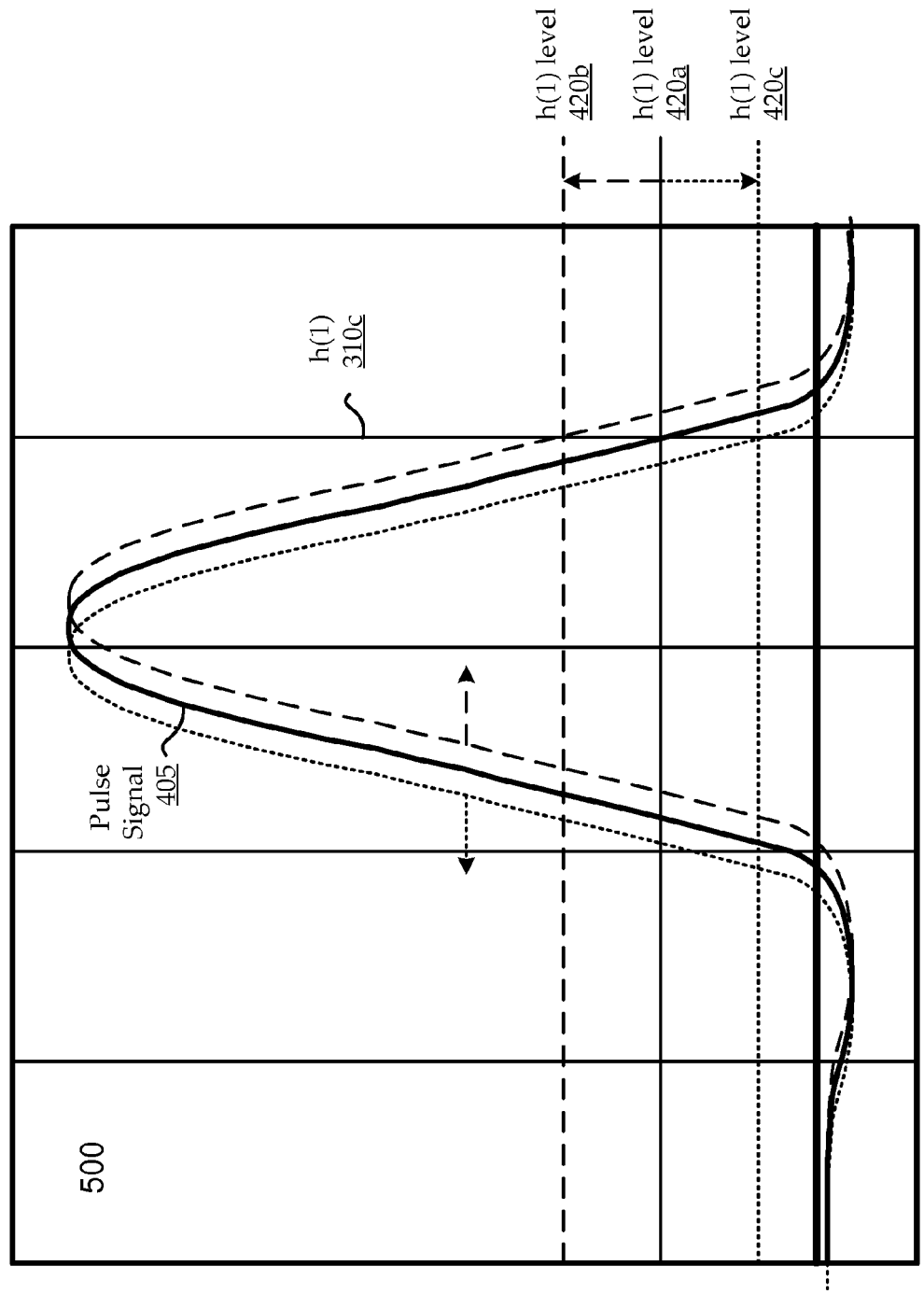
FIG. 5 shows another graph representing a zoomed-in view of a portion of the graph of FIG. 4.

FIG. 5 shows another graph 500 representing a zoomed-in view of a portion of the graph 400 of FIG. 4. Again, an illustrative pulse response signal 405 is shown in context of various sampling point unit intervals 410, including a post-cursor 410c. Three post-cursor levels 420 are shown. A first post-cursor level 420a shows the present target H(1) level for the CDR. As illustrated, the H(1) sampling location is adapted to coincide with the point at which the signal 405 crosses the post-cursor level 420a (e.g., approximately 30 mV, as illustrated in FIG. 4). Shifting the target post-cursor level 420 to a higher level (e.g., 40 mV), as illustrated by target post-cursor level 420b, can cause the sampling locations to effectively shift to the left relative to the signal 405, thereby effectively shifting the cursor locking point to the left (i.e., earlier). Shifting the target post-cursor level 420 to a lower level (e.g., 20 mV), as illustrated by target post-cursor level 420c, can cause the sampling locations to effectively shift to the right relative to the signal 405, thereby effectively shifting the cursor locking point to the right (i.e., later).

Figure 6:
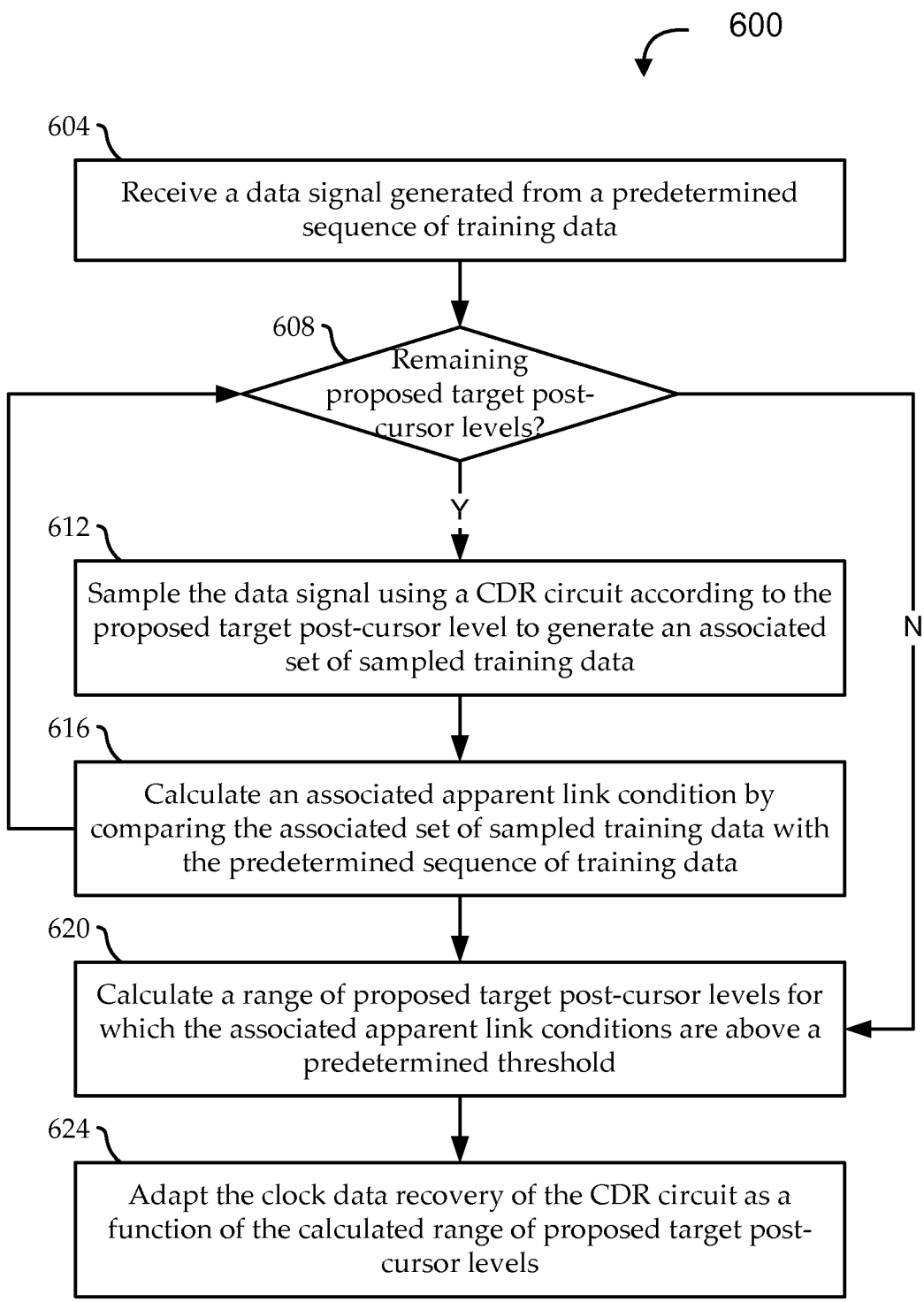
FIG. 6 shows a flow diagram of an illustrative method for at-rate clock data recovery, according to various embodiments.

FIG. 6 shows a flow diagram of an illustrative method 600 for at-rate clock data recovery, according to various embodiments. Embodiments of the method 600 begin at stage 604 by receiving a data signal generated from a predetermined sequence of training data. For example, the data signal can be communicated from a transmitter system to a receiver system (e.g., a SERDES) over a serial channel. The method 600 can then iterate for a number of proposed target post-cursor levels. For example, each target post-cursor level can be a voltage level (e.g., 10 mV, 15 mV, etc.), a locking point location, etc. Stage 608 can determine whether there are remaining proposed target post-cursor levels. If so, the method 600 can sample the pulse signal using a CDR circuit at stage 612, according to the next proposed target post-cursor level to generate an associated set of sampled training data. For example, sampling can involve deriving a reference clock from the data signal and sampling the data signal according to the reference clock. An associated apparent link quality can be calculated at stage 616 by comparing the associated set of sampled training data with the predetermined sequence of training data. For example, the apparent link quality can be a percentage of error, a bit error rate, an indication of whether there are no errors, and indication of whether there are less than some threshold number of errors, or any other suitable metric.

When there are no further proposed target post-cursor levels at stage 608, embodiments can calculate a range of proposed target post-cursor levels for which the associated apparent link qualities are above a predetermined threshold at stage 620. For example, the range indicates all the proposed target post-cursor levels resulting in error-free sampling of the training data. At stage 624, the clock data recovery of the CDR circuit can be adapted as a function of the calculated range of proposed target post-cursor levels. As described above, some implementations adapt by locking the post-cursor target of the at-rate CDR to an optimal level determined from the range (e.g., the center or average of the range). Other implementations adapt by feeding back information to a receiver-side and/or a transmitter-side equalizer. For example, the CDR can be permitted to generate a fully adaptive post-cursor level. A determination can then be made as to whether the fully adaptive post-cursor level is in the center of the range, or to one side or the other. If not centered, this can indicate a sub-optimal CDR locking point; and one or more adaptations can be applied (e.g., pre-cursor adaptation, pulse shaping, and/or the like) in an attempt to shift the locking point of the CDR.

Figure 7:
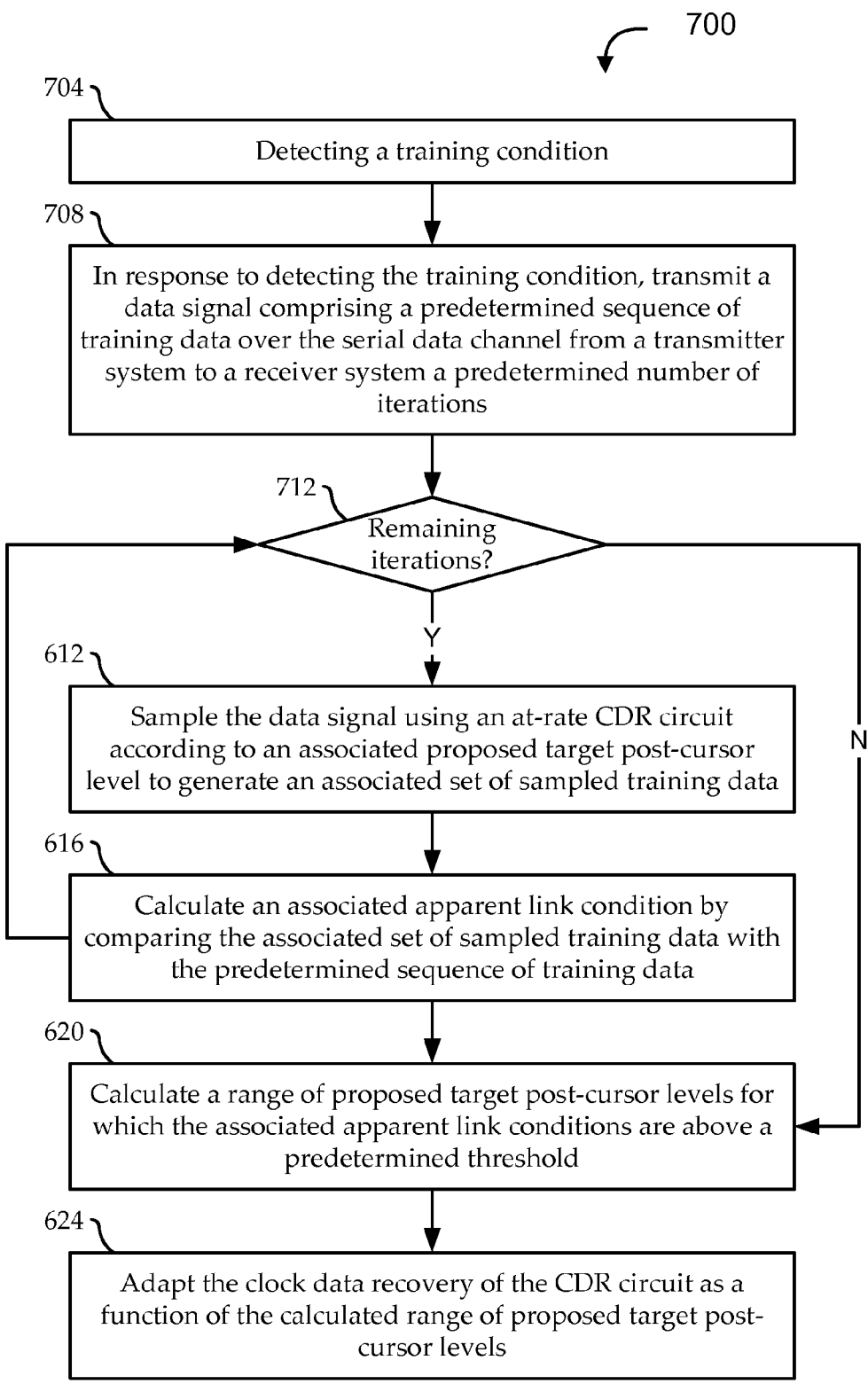
FIG. 7 shows a flow diagram of an illustrative method for tuning clock data recovery in a serial data channel, according to various embodiments.

FIG. 7 shows a flow diagram of an illustrative method 700 for tuning clock data recovery in a serial data channel, according to various embodiments. Embodiments of the method 700 begin at stage 704 by detecting a training condition. For example, the training condition can be a preset stage of a boot sequence, a periodic (scheduled, etc.) channel tuning, a detecting of a bit error condition, etc. In response to detecting the training condition, at stage 708, a data signal can be transmitted to include a predetermined sequence of training data over the serial data channel from a transmitter system to a receiver system a predetermined number of iterations. The method 700 can then iterate for the number of iterations, each iteration being associated with a proposed target post-cursor levels.

For example, stage 712 can determine whether iterations remain, and embodiments can proceed substantially as in respective stages of the method 600 of FIG. 6. For example, while iterations remain, the data signal can be sampled using a CDR circuit at stage 612, according to the proposed target post-cursor level associated with that iteration to generate an associated set of sampled training data; and an associated apparent link quality can be calculated at stage 616 by comparing the associated set of sampled training data with the predetermined sequence of training data. When there are no further iterations at stage 712, embodiments can calculate a range of proposed target post-cursor levels for which the associated apparent link qualities are above a predetermined threshold at stage 620; and the clock data recovery of the CDR circuit can be adapted as a function of the calculated range of proposed target post-cursor levels at stage 624.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for at-rate clock data recovery comprising:
   an at-rate clock data recovery (CDR) sub-circuit that operates to:
      receive a data signal generated from a predetermined sequence of training data; and
      sample the data signal according to each of a plurality of proposed target post-cursor levels to generate associated sets of sampled training data; and
   a training sub-circuit that operates to:
      calculate, for each of the plurality of proposed target post-cursor levels, an associated apparent link quality by comparing the associated set of sampled training data with the predetermined sequence of training data;
      calculate a range of proposed target post-cursor levels for which the associated apparent link qualities are above a predetermined threshold; and
      output a feedback signal to adapt a locking point of the at-rate CDR sub-circuit according to the calculated range of proposed target post-cursor levels.

2. The system of claim 1, wherein the training sub-circuit further operates to:
   calculate an optimal target post-cursor level as a function of the calculated range of proposed target post-cursor levels; and
   output the feedback signal further according to the optimal target post-cursor level.

3. The system of claim 2, wherein the optimal target post-cursor level is calculated to be substantially the middle of the calculated range of proposed target post-cursor levels.

4. The system of claim 2, wherein the adapting comprises:
   locking a post-cursor target of the at-rate CDR sub-circuit to the optimal target post-cursor level.

5. The system of claim 1, wherein the at-rate CDR sub-circuit further operates to generate an adaptive target post-cursor level, and further comprising:
   a feedback sub-circuit that operates to generate the feedback signal according to a comparison between the adaptive target post-cursor level and the calculated range of proposed target post-cursor levels, such that outputting the feedback signal adapts the locking point of the at-rate CDR sub-circuit by adapting an equalizer sub-circuit of a receiver circuit according to the feedback signal.

6. The system of claim 5, wherein the equalizer sub-circuit comprises a feed-forward equalizer.

7. The system of claim 1, wherein the at-rate CDR sub-circuit further operates to generate an adaptive target post-cursor level, and further comprising:
   a feedback sub-circuit that operates to generate the feedback signal according to a comparison between the adaptive target post-cursor level and the calculated range of proposed target post-cursor levels, such that outputting the feedback signal adapts the locking point of the at-rate CDR sub-circuit by adapting an equalizer sub-circuit of a transmitter circuit according to the feedback signal.

8. The system of claim 7, wherein the equalizer sub-circuit comprises a finite impulse response equalizer.

9. The system of claim 1, further comprising a data store coupled with the training sub-circuit and having the sequence of training data stored thereon.

10. The system of claim 1, further comprising:
    an integrated circuit having the at-rate CDR sub-circuit and the training sub-circuit integrated thereon.

11. A method for at-rate clock data recovery, the method comprising:
    receiving a data signal generated from a predetermined sequence of training data;
    for each of a plurality of proposed target post-cursor levels:
       sampling the data signal using a clock data recovery (CDR) circuit according to the proposed target post-cursor level to generate an associated set of sampled training data; and
       calculating an associated apparent link quality by comparing the associated set of sampled training data with the predetermined sequence of training data;
    calculating a range of proposed target post-cursor levels for which the associated apparent link qualities are above a predetermined threshold; and
    adapting the clock data recovery of the CDR circuit as a function of the calculated range of proposed target post-cursor levels.

12. The method of claim 11, further comprising:
    calculating an optimal target post-cursor level as a function of the calculated range of proposed target post-cursor levels,
    wherein the adapting is performed as a function of the optimal target post-cursor level.

13. The method of claim 12, wherein the optimal target post-cursor level is calculated to be substantially the middle of the calculated range of proposed target post-cursor levels.

14. The method of claim 12, wherein the adapting comprises:
    locking a post-cursor target of the CDR circuit to the optimal target post-cursor level.

15. The method of claim 11, wherein the adapting comprises:
    generating, using the CDR circuit, an adaptive target post-cursor level;
    generating a feedback signal according to a comparison between the adaptive target post-cursor level and the optimal target post-cursor level; and tuning an adaptation of a receiver-side equalizer unit coupled with the CDR circuit according to the feedback signal.

16. The method of claim 11, wherein the adapting comprises:
   generating, using the CDR circuit, an adaptive target post-cursor level;
   generating a feedback signal according to a comparison between the adaptive target post-cursor level and the optimal target post-cursor level; and
   tuning an adaptation of a transmitter-side equalizer unit communicatively coupled with the CDR circuit according to the feedback signal.

17. The method of claim 11, wherein the proposed target post-cursor levels are proposed target post-cursor locking points.

18. A method for tuning clock data recovery for a serial data channel, the method comprising:
   detecting a training condition;
   in response to detecting the training condition, transmitting a data signal comprising a predetermined sequence of training data over the serial data channel from a transmitter system to a receiver system a predetermined plurality of iterations;
   for each of the plurality of iterations:
      sampling the data signal using an at-rate clock data recovery (CDR) circuit according to an associated proposed target post-cursor level to generate an associated set of sampled training data; and
      calculating an associated apparent link quality by comparing the associated set of sampled training data with the predetermined sequence of training data;
   calculating a range of proposed target post-cursor levels for which the associated apparent link qualities are above a predetermined threshold; and
   adapting the clock data recovery of the CDR circuit as a function of the calculated range of proposed target post-cursor levels.

19. The method of claim 18, wherein detecting the training condition comprises reaching a channel training portion of a boot sequence.

20. The method of claim 18, wherein detecting the training condition comprises detecting bit errors indicating errors in the serial channel.

* * * * *